United States Patent [19]

Ohtsuka

[11] 4,299,315
[45] Nov. 10, 1981

[54] PASSAGE STRUCTURE OF LOCK-UP TORQUE CONVERTER USING SPECIALLY DESIGNED SPACER

[75] Inventor: Kunio Ohtsuka, Yokohama, Japan

[73] Assignee: Nissan Motor Company, Limited, Yokohama, Japan

[21] Appl. No.: 23,374

[22] Filed: Mar. 23, 1979

[30] Foreign Application Priority Data

Apr. 4, 1978 [JP] Japan .................................. 53/38856

[51] Int. Cl.³ ............................................. F16D 25/00
[52] U.S. Cl. ..................................................... 192/3.3
[58] Field of Search ...................... 192/3.3, 3.33, 3.29, 192/3.28; 415/90

[56] References Cited

U.S. PATENT DOCUMENTS

| | | | |
|---|---|---|---|
| 2,548,207 | 4/1951 | Dunn | 192/3.29 |
| 2,726,557 | 12/1955 | Ackerman | 192/3.3 X |
| 2,793,726 | 5/1957 | Jandasek | 192/3.31 X |
| 2,824,631 | 2/1958 | De Lorean | 192/3.31 X |

Primary Examiner—George H. Krizmanich
Attorney, Agent, or Firm—Schwartz, Jeffery, Schwaab, Mack, Blumenthal & Koch

[57] ABSTRACT

Simple passage structure of a lock-up torque converter is disclosed. A first spacer is mounted within an annular space between an output shaft and a stationary sleeve to divide the annular space into a first annular chamber communicating with the inside of a turbine runner and into a second annular chamber communicating with a clutch chamber. The first spacer is formed with a first cutout mating with a radially extending drain passage formed within a pump cover and a second cutout mating with a radially extending passage formed within the pump cover and communicating with the control valve. The first cutout is open to the first annular chamber so that communication between the first annular chamber and the radial drain passage of the pump cover is provided. The second cutout is open to the second annular chamber so that communication between the second annular chamber and the other radial passage of the pump cover is provided.

4 Claims, 3 Drawing Figures

PASSAGE STRUCTURE OF LOCK-UP TORQUE CONVERTER USING SPECIALLY DESIGNED SPACER

BACKGROUND OF THE INVENTION

The present invention relates to a torque converter, and has particular reference to a lock-up torque converter, a torque converter employing a direct drive clutch.

Motor vehicles installed with an automatic transmission including a torque converter give an easy drivability but are poor in fuel economy because there is a slip within the torque converter between a pump impeller thereof and a turbine runner thereof. Therefore, there have been proposed lock-up torque converters in which during a certain operation mode such as high speed engine operation where engine cyclic torque variation is small and negligible, the turbine runner will be coupled directly with the pump impeller to prevent the occurrence of slip in the torque converter thereby to improve fuel economy.

The lock-up torque converters require, for the purpose of operating the clutch, a passage providing communication between a clutch chamber and a lock-up control valve mounted within an oil pump cover radially extending from a stationary sleeve.

According to a conventional lock-up torque converter disclosed in U.S. Pat. No. 2,793,726, an output shaft is formed with an axial passage and with a radial passage extending from the axial passage to the bottom of a circumferential groove formed around the output shaft. A bushing is mounted within an annular space between the output shaft and a stationary sleeve with an axial end thereof abuting a shoulder of the output shaft. The bushing is fixed to the stationary sleeve, surrounds the circumferential groove and is formed with a cutout mating with the circumferential groove and a passage formed in a pump cover communicating with a lock-up control valve. The stationary sleeve is formed at an inner surface thereof with an axial groove or recess. This axial groove runs above that portion of the bushing which is not formed with the cutout. Communication between the control valve and a clutch chamber is established through the passage within the pump cover, the cutout of the bushing, the circumferential groove of the output shaft, the radial passage opening at the bottom of the circumferential groove, the axial passage of the output shaft and a second radial passage formed in the output shaft and opening to the clutch chamber. A pump driving sleeve surrounds a portion of the stationary sleeve shaft and formes therewith a torque converter oil feed passage communicating with the inside of a pump impeller. Oil is fed to the pump impeller through the feed passage and discharged from a turbine runner through the annular space and the axial groove formed in the stationary sleeve.

In this known passage structure, the circumferential groove formed in the output shaft and the bushing with the cutout are necessary for providing communication between the radial passage opening to the axial passage formed within the output shaft and the passage formed in the pump cover communication with the control valve.

A problem with this known lock-up torque converter is derived from the provision of the output shaft with the circumferential groove. The problem resides in that, in designing an output shaft, the diameter of the output shaft must be sufficiently large enough to compensate for the structural weakness caused by the formation of a circumferential groove around the output shaft. Thus, it is necessary to use an output shaft large enough to compensate for the structural weakness caused by the circumferential groove.

SUMMARY OF THE INVENTION

An object of the present invention is to provide a lock-up torque converter employing a simple passage structure which permits the use of an output shaft having no structural weakness.

According to the invention, an annular space between an output shaft and a stationary sleeve is divided by a spacer into a first annular chamber communicating with the inside of a turbine runner and into a second annular chamber. The output shaft is formed with an axial passage and with a radial passage communicating with the axial passage. This radial passage is open to the second annular chamber which in turn communicates with a lock-up control valve.

One advantage of the lock-up torque converter according to the present invention over that according to the prior art mentioned above resides in that, in designing an output shaft, the diameter of the output shaft can be reduced according to the invention as compared to the diameter of an output shaft for the prior art which must be large enough to compensate for the structural weakness caused by the provision of a circumferential groove.

Another object of the present invention is therefore to reduce the diameter of an output shaft of a lock-up torque converter so as to reduce the radial dimension of the torque converter.

According to the invention, the spacer is formed with a first cutout mating with first and second radially extending passages in a pump cover. These passages include a drain passage formed within the pump cover and a radially extending passage formed within the pump cover and communicating with a lock-up control valve. The first cutout is open to the first annular chamber so that communication between the first annular chamber and the radial drain passage is provided. The second cutout is open to the second annular chamber so that communication between the second annular chamber and the other radial passage is provided.

Still another object of the invention is therefore to simplify passage connection between the pump cover and the two annular chambers formed between the output shaft and the stationary sleeve.

BRIEF DESCRIPTION OF THE DRAWINGS

Other advantages and features of the present invention will become clear as the discussion proceeds as to the preferred embodiment of a lock-up torque converter in connection with the accompanying drawings.

In the accompanying drawings.

DESCRIPTION OF THE PREFERRED EMBODIMENTS

Figure 1:
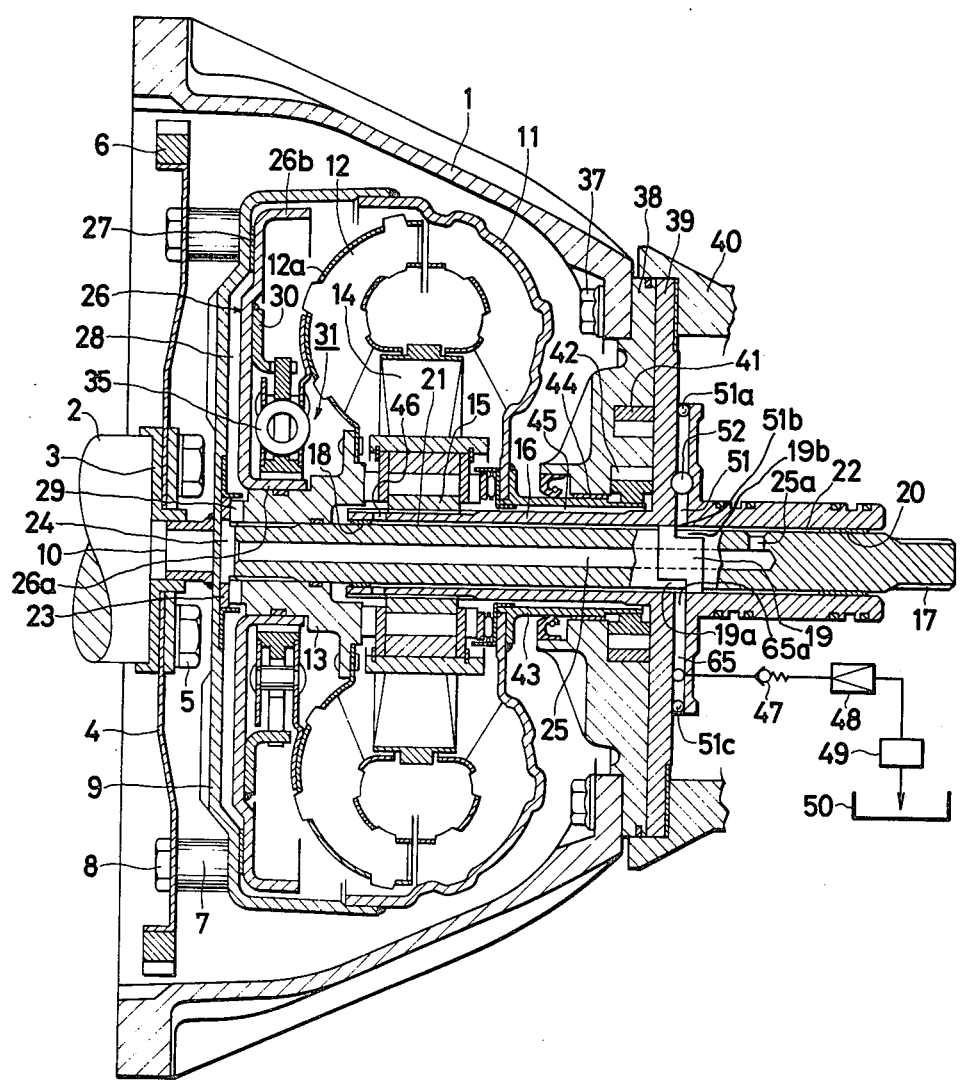
FIG. 1 is a longitudinal sectional view of the preferred embodiment of a lock-up torque converter according to the present invention together with a diagram showing an oil circuit leading from the torque converter to an oil reservoir.

Referring to FIG. 1, the reference numeral 1 designates a converter housing and the reference numeral 2 a crankshaft. A boss 3 and a drive plate 4 are concentrically secured to the end of the crankshaft 2, such as, by means of a plurality of fasteners 5. Drive plate 4 carries at its outer periphery of a ring gear 6. Drive plate 4 is drivably connected to a converter cover 9 concentrically by means of a plurality of fasteners 8 using the corresponding number of spacers 7. A sleeve 10 is secured to the central portion of the converter cover 9. The sleeve 10 is received in the boss member 3 and thus the converter cover 9 is centered with respect to the crankshaft 2. Converter cover 9 has a cylindrical shape having a closed end wall adjacent the drive plate 4 and an open end. To the outer periphery of the converter cover 9 adjacent the axial end defining the open end thereof, a pump impeller 11 is secured by welding so as to be coupled with the converter cover 9. A turbine runner 12 is secured to a hub 13 at a flange thereof by rivetting. A stator 14 is situated between the pump impeller 11 and the turbine runner 12 to form a torque converter. Stator 14 is mounted to a hollow stationary sleeve 16 through a one-way clutch 15.

The stationary sleeve 16 permits an output shaft 17, which may be a transmission input shaft, to extend therethrough with an annular space or play between them. Between the stationary sleeve 16 and the output shaft 17 three spacers (bushings) 18, 19 and 20 are disposed axially spaced one after another to divide the annular space into two annular chambers 21 and 22. The hub 13 for the turbine runner 12 is splined to the output shaft 17. Between the closed end wall of the converter cover 9 and its adjacent axial end of the hub 13, an annular member or spacer 23 is disposed to define an end chamber 24. This end chamber 24 communicates with the annular chamber 22 through an axial passage 25 formed on the output shaft 17 and through a radial passage 25a formed therein.

A generally annular clutch piston 26 is slidably mounted on the hub 13 on an annular portion thereof. An annular clutch facing 27 is attached to the adjacent surface of the clutch piston 26 to the converter cover 9. When the cluth facing 27 of the clutch piston 26 engages with the adjacent surface of the end wall of the converter cover 9 upon engagement of the clutch, a clutch chamber 28 is formed between the converter cover 9 and the clutch piston 26. The clutch chamber 28 communicates with the annular chamber 24 through radial grooves or passages 29 formed at one axial end of the hub 13. Secured to the remote end wall of the clutch piston 26 is an annular mounting member 30. Within a limited space available between the inner periphery of the turbine runner 12 and the inner periphery of the clutch piston 26 a damper 31 including springs 35 is operatively connected between the clutch piston 26 and the hub 13 to provide a driving connection.

The construction of the clutch piston 26 and that of the annular mounting member 30 will be described hereinafter. The clutch piston 26 is die formed from a piece of sheet metal and includes a inner axially extending flange 26a and an outer axially extending, in the same direction, flange 26b. The clutch piston 26 is slidably mounted by the inner axially extending flange 26a on the hub 13. The outer axially extending flange 26b is formed for reinforcement purpose of the annular portion of the clutch piston 26 which will be subjected to difference, in pressure, upon engagement of the lock-up clutch. The annular mounting member 30 has a plurality of inner axially extending circumferentially spaced mounting legs 30a.

The remote open end of the converter housing 1 from the crankshaft 2 is secured to a pump housing 38 which in turn is secured to a pump cover 39 secured to a transmission case 40 by means of fasteners 37. The pump cover 39 extends radially from the stationary sleeve 16. Within the pump housing 38, oil pump elements including an outer gear 41 and an inner gear 42 are operatively disposed. A pump driving sleeve 43 extends into the pump housing 38 and journalled thereby means of a bushing 44. The pump driving sleeve 43 permits the stationary sleeve 16 to extend therethrough, and has one axial end drivingly connected to the pump impeller 11 and has an opposite end splined to the inner gear pump element 42. The pump driving sleeve 43 is spaced from and surround a portion of the stationary sleeve 16 to form with the latter an annular oil feed passage 45. The oil feed passage 45 communicates with the inside of the pump impeller 11 of the torque converter assembly.

Radial passages 46 formed through the stationary sleeve 16 provides communication between the inside of the turbine runner 12 and the annular chamber 21.

Figure 3:
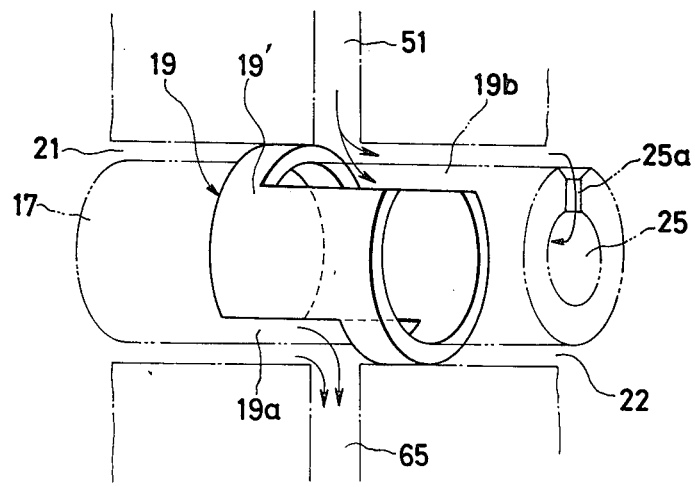
FIG. 3 is an enlarged view, diagrammatically shown, of part of FIG. 1 showing the specially designed spacer used in the torque converter shown in FIG. 1.

In order to simplify passage connection between the pump cover 39 and the two annular chambers 21 and 22 on the opposite sides of the bushing 19, the bushing 19 is formed with a first cutout 19a and with a second cutout 19b, as best seen in FIG. 3.

Referring to FIGS. 1 and 3, the first cutout 19a mates with a radial extending passage 65 and opens axially to the annular chamber 21, while, the second cutout 19b mates with a radially extending passage 51 and opens axially to the annular chamber 22.

These passages 51 and 65, which terminate, respectively, in ports 51b and 65a, can be radially aligned to each other by using the specially designed bushing 19. With this, forming of the passages 51 and 65 has been simplified. A radial hole is formed, such as by drilling, through the pump cover 39 and two fit-in balls 51a and 51c are used to close the hole to provide the passages 51 and 65 (see FIG. 1).

The radial passage 65 communicates with a pressure maintaining valve 47 which, in turn, communicates with an oil cooler 48. The oil cooler 48 communicates with various parts 49 which require lubrication and with an oil reservoir 50.

The radial passage 51 communicates with a lock-up control valve 52 mounted within the pump cover 39. The control valve 52 has the function to selectively pressurizes or exhausts the radial passage 51.

The bushing 19 is fixed relative to the stationary sleeve 16 so that the cutouts 19a and 19b are kept in mating with the radial passages 65 and 51, respectively.

Figure 2:
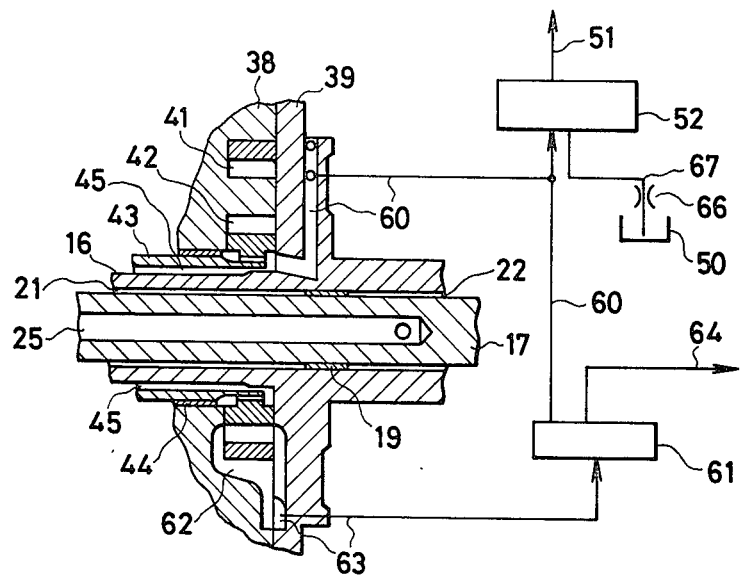
FIG. 2 is a circuit diagram explaining the operation of a lock-up control valve.

Referring to FIG. 2, a discharge passage 63 provides communication between the discharge side 62 of the pump and a pressure regulator valve 61 which provides a so-called line pressure at a passage 64 which selectively communicable with various servos of a hydraulic control system for a transmission mechanism to which an input power is fed by the output shaft 17. The oil displaced upon regulating function within the pressure regulator valve 61 is discharged into a passage 60. This passage 60 communicates with the passage 45 which communicates with the inside of the pump impeller 11.

Although only diagrammatically shown in FIG. 2, the control valve 52 is responsive to a pressure signal representing a predetermined condition in which a lock-up of the torque converter is desirable to take a first position in which the passage 51 (see FIG. 1 also) is connected to a drain passage 67 provided with a flow restrictor 66 so that the passage 51 is exhausted. Under the other conditions, the control valve 52 take a second position in which the passage 51 is connected to the passage 60 so that the passage 51 is pressurized.

It will now be understood from the preceeding description and the inspection of FIGS. 1 and 2 that pressurized oil will flow into the pump impeller 11 through the passage 60 (see FIG. 2) formed in the pump cover 39 and the passage 45 between the stationary sleeve 16 and the pump driving sleeve 43, and the oil will flow out of the turbine runner 12 toward the oil cooler 48 through the radial passages 46 formed in the stationary sleeve 16, the annular chamber 21, the radial passage 65 and the pressure maintaining valve 47.

It will also be understood that the control valve 52 communicates with the clutch chamber 28 through the radial passage 51, the annular chamber 22, the radial passage 25a, the axial passage 25, the end chamber 24 and the radial passages 29.

The operation of the torque converter according to the invention will be understood from the following description.

The rotation of the crankshaft 2 is always delivered to the pump impeller 11 through the drive plate 4, the fasteners 8 and the converter cover 9. The rotation of the pump impeller 11 is delivered through the pump driving sleeve 43 to the pump element inner gear 42. Thus the oil pump operates as long as the engine operates.

When the vehicle operating condition does not satisfy a predetermined condition in which lock-up clutch engagement is required, the control valve 52 permits the passage 51 to be pressurized. Meanwhile, oil is supplied to the inside of the pump impeller 11. The oil in the inside of the torque converter assembly flows out of the turbine runner 12. The oil discharged from the turbine runner 12 flows toward the pressure maintaining valve 47, thus the pressure within the torque converter assembly being maintained at a certain level determined by the pressure maintaining valve 47. This pressure, i.e., the pressure within the torque converter assembly, is transmitted through the lock-up control valve 52, the passages 51 and 25, the chamber 24 and radial passage 29 to the clutch chamber 28. Thus, the clutch piston 26 is held disengaged from the converter cover 9 when the clutch chamber 28 is pressurized.

Under this condition, the torque converter will perform its torque multiplying function because the oil maintained at the certain pressure will transmit the torque under the reaction of the stator 14 from the pump impeller 11 to the turbine runner 12.

The oil after flowing through the pressure maintaining valve 47 will flow to the oil cooler 48 installed within the lower tank of the radiator. After being cooled by the oil cooler 48, the oil will be distributed to the various parts or portions to be lubricated in the transmission and thereafter flow back to the oil reservoir 50, i.e., the oil pan of the transmission. The oil pump including the gears 41 and 42 will draw oil from this oil reservoir 50.

When the vehicle operating condition satisfies the predetermined condition, for example, when the vehicle operates at speeds above a predetermined speed in the highest gear, the control valve 52 will permit the passage 51 to be exhausted. This will cause the oil within the clutch chamber 28 to be exhausted through the radial passages 29, the end chamber 24, the oil passage 25, the oil passage 51 and through the control valve 52 so that the clutch piston 26 will be urged toward the left (viewing in FIG. 1) to engage with the converter cover 9 under the influence of the difference in pressure created between the both sides of the clutch piston 26. When the clutch facing 27 attached to the clutch piston 26 firmly engages with the converter cover 9, the piston 26 will be directly connected to the converter cover 9 which in turn is connected to the crankshaft 2 and the pump impeller 11 to rotate with them as a unit. The rotation of the clutch piston 26 is transmitted to the turbine runner 12 mechanically through the annular mounting member 30 and the damper 31. The impact upon initiation of the transmission of the rotational torque will be absorbed by the springs 35. Thus, the damper 31 will transmit the torque while suppressing the impact which otherwise would take place upon change in magnitude of the torque transmitted therethrough. In this manner, the turbine runner 12 is directly connected to the crankshaft 2 and the pump impeller 11 through the damper 31, the clutch piston 26 and the converter cover 9.

It will be understood that the connection between a radial passage within a pump cover and a radial passage within an output shaft communicating with an axial passage within the output shaft has been simplified by using an annular chamber between two bushings, which rotatably support the output shaft.

It will also be understood that the use of a specially designed bushing has simplified passage connection between the pump cover and two axially spaced annular chambers formed between a stationary sleeve and an output shaft.

What is claimed is:

1. In a lock-up torque converter
an input member;
a converter cover driven by said input member;
a pump impeller secured to said converter cover and forming therewith a chamber;
an output shaft having first and second spacers disposed thereon
a turbine runner within said chamber connected to said output shaft;
a clutch piston mounted within said chamber;
a stationary sleeve rotatably receiving said output shaft and defining therein an annular space between said first and second spacers;
a pump;
a pump cover for said pump radially extending from said stationary sleeve;
a pump driving sleeve secured to said pump impeller and operatively connected to said pump to drive the latter, said pump drive sleeve surrounding a portion of said stationary sleeve and forming therewith a passage communicating with the inside of said pump impeller;
a control valve;
said output shaft having an axial passage and a radial passage communicating with said axial passage;
a third spacer mounted within said annular space to divide the latter into a first annular chamber communicating with the inside of said turbine runner and into a second annular chamber communicating with said radial passage of said output shaft;

said pump cover having a first passage terminating at a first port positioned opposite to said third spacer and a second passage terminating at a second port positioned opposite to said third spacer;

said second passage of said pump cover communicating with said control valve;

said third spacer being formed with a first cutout mating with said first port of said pump cover and opening to said first chamber to provide communication between said first port of said pump cover and said first annular chamber;

said third spacer being also formed with a second cutout mating with said second port of said pump cover and opening to said second annular chamber to provide communication between said second port and said second annular chamber.

2. A lock-up torque converter as claimed in claim 1, in which said first and second passages of said pump cover extend radially.

3. In a lock-up torque converter the combination of:
an input member;
a converter cover driven by said input member;
a pump impeller secured to said converter cover and forming therewith a chamber;
an output shaft;
a turbine runner within said chamber connected to said output shaft;
a clutch piston mounted within said chamber and drivingly connected to said turbine runner;
said clutch piston being engageable with said converter cover to lock said turbine runner with said pump impeller and forming therewith a clutch chamber only when said clutch piston is in engagement with said converter cover;
a stationary sleeve member fixed to said converter cover so as to surround part of said output shaft, said part of said output shaft having a uniform diameter;
first, second and third bushes disposed on said output shaft for journaling it in said stationary sleeve member and defining between said output shaft and said stationary sleeve first and second closed annular chambers, said first chamber being defined between said first and second bushes and said second chamber being defined between said second and third bushes;
means defining an elongate blind bore in said input shaft which fluidly communicates with said clutch chamber;
means defining a radial passage fluidly communicating said elongate bore and said second chamber;
a lock-up valve;
means defining a first cutout in said second bush which fluidly communicates with said first annular chamber;
means defining a second cutout in said second bush which fluidly communicates with said second annular chamber;
means defining a first passage in said stationary sleeve which fluidly communicates with said first annular chamber via said first cutout; and
means defining a second passage in said stationary sleeve which fluidly communicates with said second annular chamber via said second cutout, and said lock-up valve.

4. A combination as claimed in claim 3, wherein said first and second annular passages extend radially with respect to said output shaft and are coaxial with one another.

* * * * *